United States Patent [19]
Eckstein

[11] 3,890,682
[45] June 24, 1975

[54] SHAPING AND TURNING MACHINE
[75] Inventor: George R. Eckstein, Fairfield, Conn.
[73] Assignee: Remington Arms Company, Inc., Bridgeport, Conn.
[22] Filed: Sept. 29, 1951
[21] Appl. No.: 248,921

[52] U.S. Cl. .......................... 29/1.3; 82/2.7; 86/10
[51] Int. Cl............................................ B21d 51/54
[58] Field of Search ............. 29/1.3, 1.31, 1.32, 33; 113/38.1, 43; 82/2.7; 86/10

[56] References Cited
UNITED STATES PATENTS

| | | | |
|---|---|---|---|
| 351,747 | 11/1886 | Dimon | 29/1.32 |
| 1,079,706 | 11/1913 | Hodge | 29/1.32 |
| 1,289,389 | 12/1918 | Calleson | 72/346 |
| 1,690,541 | 11/1928 | Kuzelewski | 82/2.7 |
| 1,924,962 | 8/1933 | Rosenbaum | 29/33 |
| 2,184,030 | 12/1939 | Wolff | 29/1.31 |
| 2,321,298 | 6/1943 | Johnson et al. | 29/1.32 |
| 2,359,939 | 10/1944 | Reynolds | 82/2.7 |

FOREIGN PATENTS OR APPLICATIONS

| | | | |
|---|---|---|---|
| 14,014 | 1889 | United Kingdom | 86/10 |

Primary Examiner—Benjamin A. Borchelt
Attorney, Agent, or Firm—John H. Lewis, Jr.

EXEMPLARY CLAIM

1. Apparatus for operating on hollow cylindrical workpieces comprising a tubular forming die of solid one-piece cross section, means for feeding workpieces into alignment with said die, means for thrusting workpieces into said solid die whereby said workpieces are shaped to the configuration of said die, means for revolving said die about an axis concentric with the workpiece therein, a tool, means for applying said tool to said workpiece while rotating said die to perform an operation thereon and for retracting said tool upon completion of said operation, means for ejecting said workpiece from said die comprising a tubular member and connections thereto for applying a jet of compressed air to the interior of said hollow workpiece, a carriage mounting said workpiece thrusting and ejecting means, and hydraulic means for reciprocating said carriage in the direction of the axis of said die.

1 Claim, 3 Drawing Figures

INVENTOR
George R. Eckstein
BY
ATTORNEYS

INVENTOR
George R. Eckstein
BY
ATTORNEYS

SHAPING AND TURNING MACHINE

This invention relates to a machine for performing sizing and machining operations or workpieces of elongated cylindrical configuration, and has been illustrated as applied to the concurrent tapering, necking, head turning and mouth trimming of cartridge cases.

Metallic cartridges of the centerfire type are ordinarily manufactured by cutting blanks from sheet stock of substantially the maximum thickness required in the head portion of the case. From such blank, in a series of drawing and annealing operations, there is formed a relatively thin cylindrical case closed at one end by a thick head. In a heading operation, the head is interiorly and exteriorly shaped and, thereafter, the case is tapered and necked to the desired exterior configuration. The mouth end is trimmed to the desired over-all length, and an extractor groove is cut adjacent the head end in an operation commonly known as "head turning". Heretofore, it has been the practice of perform tapering and necking in a die and to thereafter transfer the workpiece to separate machines for head turning and mouth trimming operations. For these operations, the case is inserted in a chuck, and the accuracy of case length and positioning of extractor groove depend upon the longitudinal placement of the case in the chuck. The present invention contemplates performing all four of these operations in a single machine, the workpiece being held for the machining operations in the die in which it is necked and tapered, thereby obviating the error and scrap introduced by variations in the placement of the workpiece in the holding devices of a succession of machines.

Figure 3:
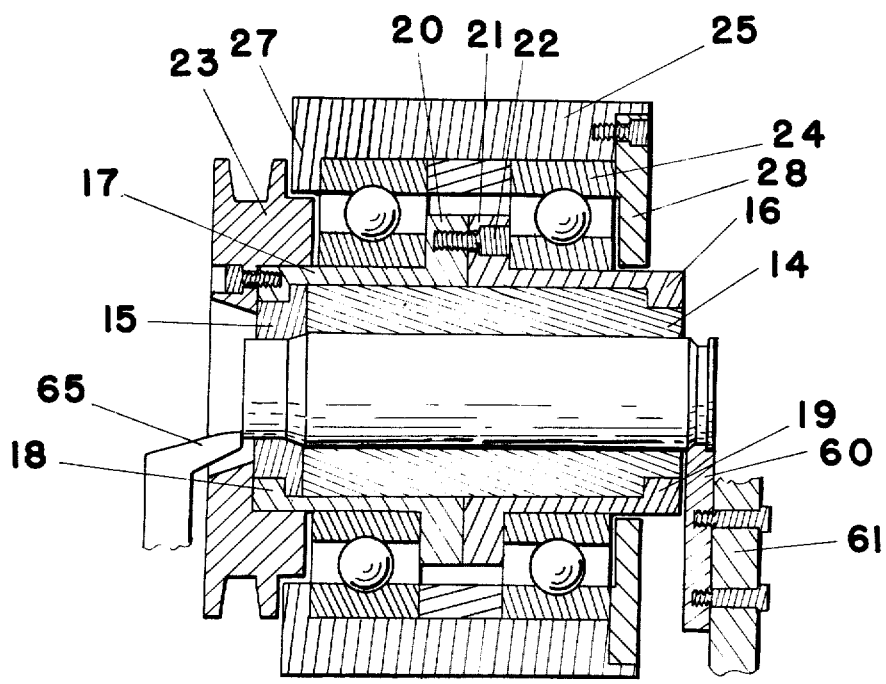
FIG. 3 is a sectional plan view of a combination die-and-chuck in which a workpiece is die-shaped to a desired configuration and, while held in the die-chuck, is subjected to certain machining operations.

The main supporting frame of the machine comprises a pair of side plates 10–11 which are joined at an intermediate point by top plate 12 and bottom plate 13, said top and bottom plates forming a support for the combination chuck-and-die illustrated in FIG. 3. The die itself consists of two parts, an elongated body tapering die 14 and, in endwise abutting relation thereto, a shorter necking die 15. These two die sections are received in the cylindrical bores of a pair of die retainers 16–17, which retainers comprise inwardly extending flanges 18–19 adapted for engagement with shoulders on die members 14–15 respectively. The retainers also comprise outwardly extending and abutting flanges 20–21 which are joined by suitable means, such as bolts, one of which is illustrated at 22. Secured to one end of the retainer assembly is a suitable drive means such as belt wheel 23. The exterior surfaces of the retainers receive the interior parts of ball bearings, identified generally by numeral 24, the outer parts of these bearings being held in a housing 25 of exterior rectilinear configuration such that it is adapted to be received between the top and bottom plates 12 and 13. Since, in the tapering operation, the assembly is subjected to a substantial endwise thrust, the housing is preferably provided with upper and lower flanges 26 (FIG. 1) adapted for lateral engagement with said plates. The housing is interiorly flanged, as shown at 27, to laterally engage one of the bearing 24 while the opposite bearing is engaged by a retainer ring 28 secured to the housing.

Figure 2:
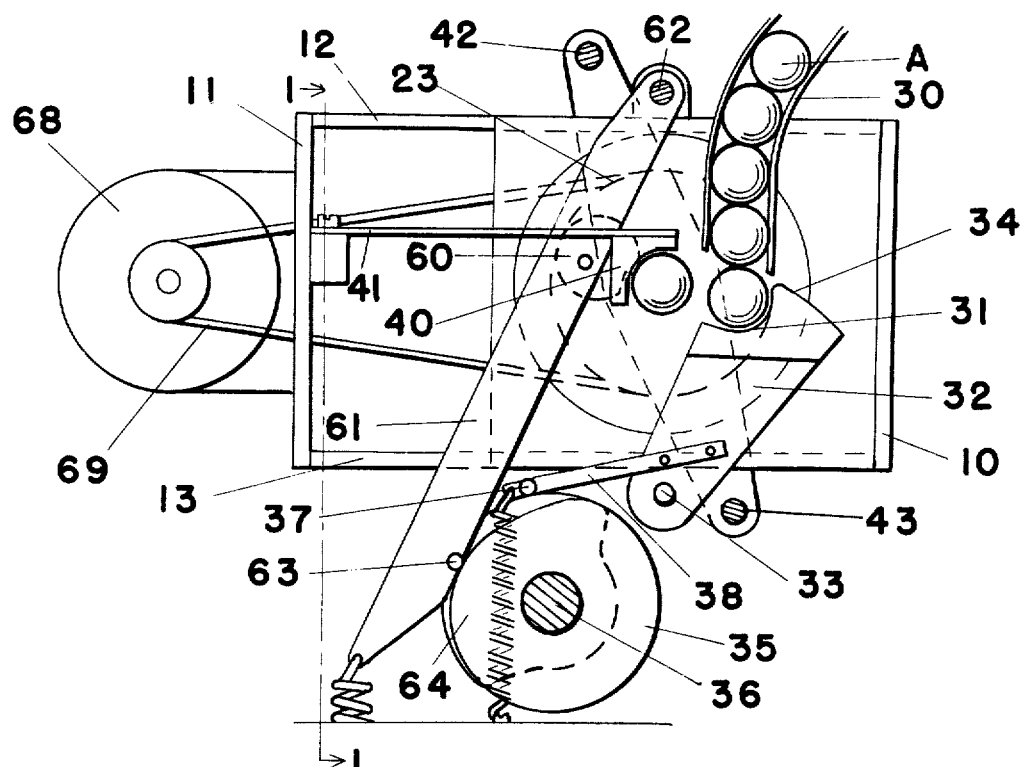
FIG. 2 is a transverse sectional elevation, substantially on the line 2—2 of FIG. 1.

Workpieces A are fed into the machine through a feed chute 30, in which they are in lateral engagement with each other. The interior end of the feed chute 30 is substantially vertically disposed, as shown in FIG. 2, and the lowermost workpiece therein is supported on an arcuate surface of head 31 of a feed lever 32 supported on a fixed pivot 33. The head 31 comprises a curving abutment or cut-off surface 34 which serves to support the column of workpieces in the feed chute when the feed lever is displaced to deliver a workpiece into a position in alignment with the mouth of the die member 14. Said feed lever is actuated by a cam 35 on cam shaft 36 through cam follower 37 carried by arm 38 which is rigidly secured to feed lever 32. Cam shaft 36, which carries a plurality of cams for performing various functions, extends longitudinally of the machine, is suitably supported from the main frame, and is driven from a source of power (not shown) through drive wheel 39. Positioning of a workpiece in alignment with the mouth of tapering die 14 is assisted by the engagement of the periphery of the workpiece with the arcuate surface of a fixed guide member 40 suitably supported as by an arm 41 secured to and extending from side plate 11.

Movement of a workpiece into the tapering and necking die is effected by the longitudinal displacement of a carriage which may be actuated by any suitable means. Since this movement effects the shaping of the workpiece, considerable power is required. A convenient carriage moving means comprises a hydraulic cylinder adjacent one end of the carriage and a supplemental air cylinder acting on the opposite end of the carriage. The carriage itself comprises upper and lower side rods 42 and 43, respectively, said rods being joined at their ends by crossheads 44 and 45, each of said crossheads being joined at its mid-point to an arbor held in alignment with the die aperture by a suitable bearing secured to the machine frame. The arbor or thrust rod which effects the transfer of workpiece in turn from the feed lever head 31 into the die is identified by numeral 47 and is joined to a piston rod 48 projecting from hydraulic cylinder 49. A spring 50 is interposed between crosshead 45 and a suitable abutment which may be the end of the rigidly mounted hydraulic cylinder 49. Extending toward the die from crosshead 44 is an ejector rod 51 which is preferably provided with an air passage 52 for the admission of air which assists in the ejection of a finished workpiece from the die-chuck. A yoke 53 secured to and extending outwardly from the mid-portion of crosshead 44 provides clearance for the attachment to ejector rod 51 of a connection to a source of compressed air (not shown). To yoke 53 is secured a piston rod 54 projecting from an air cylinder 55. The valves controlling the air and hydraulic systems are mounted in a valve chest indicated at 56 and are controlled through cam followers 57 by cams 58 mounted on the aforementioned cam shaft 36.

As heretofore stated, the present invention contemplates the machining of both ends of a workpiece while such workpiece is held in the combination die-chuck in the position therein to which it has been moved by the thrust member 47. It will be obvious that in this manner a high degree of accuracy of machining and trimming with respect to the length and configuration of the workpiece as determined by the die can be secured. For this purpose the die-chuck is rotated by means of an hydraulic motor 68 through a belt 69 engaging belt wheel 23. The operation on the head of the workpiece is the turning of an extractor groove. The same turning operation may slightly chamfer the rim portion of the shell face. The head turning tool 60 (FIG. 2) may conveniently be mounted on an arm 61 pivoted on an arbor 62 at the top of the machine and provided with a cam follower 63 engaging a cam 64 on cam shaft 36. To provide an accurate adjustment of the head turn tool 60 with respect to the length of the die and the workpiece therein, the arbor 62 may be held in bearings 621 which provide abutments for an adjusting nut 622 by which the endwise position of the arbor is determined. The tool 65 for trimming the mouth of the workpiece (which projects outward a short distance from the face of the necking die 15, as shown in FIG. 3) is mounted for pivotal movement, as at 66, and is controlled by a cam 67 on cam shaft 36.

Figure 1:
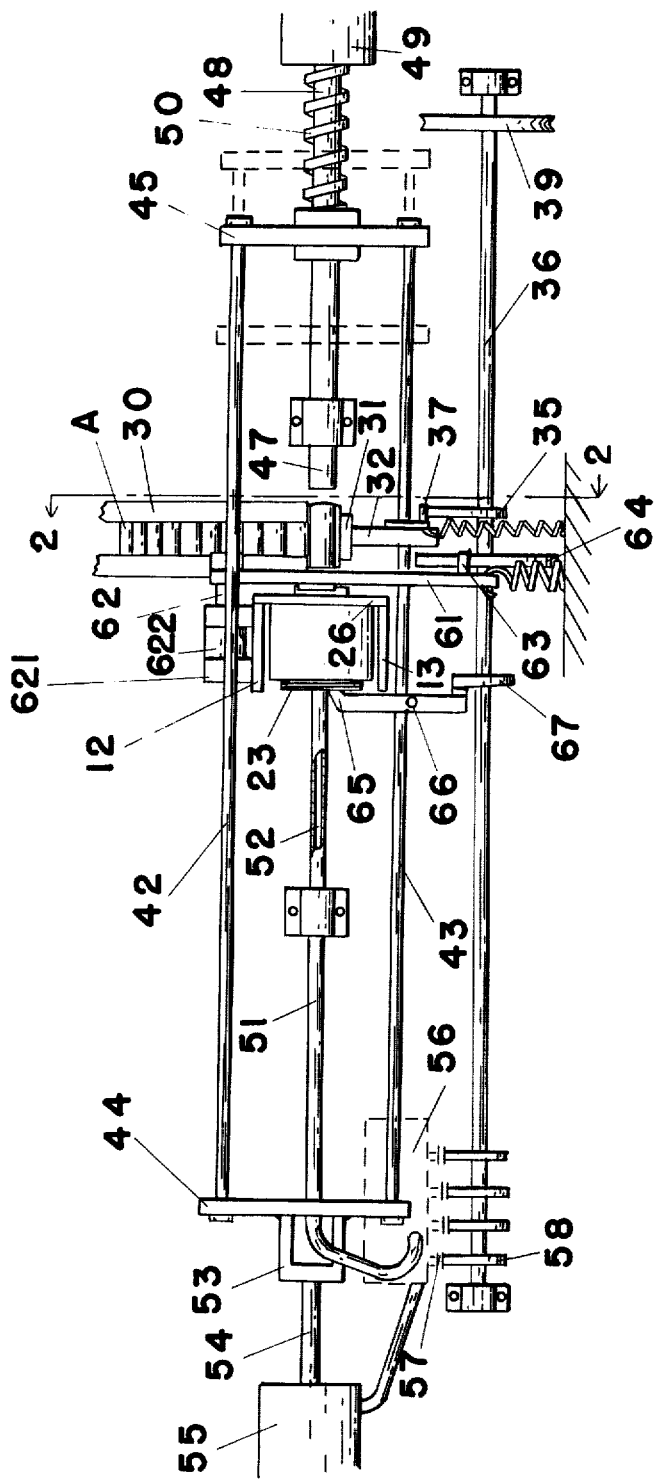
FIG. 1 is a fragmentary somewhat diagrammatic longitudinal sectional elevation, the section being substantially on the line 1—1 of FIG. 2.

FIG. 1 shows in full lines the position of the carriage and associated parts during the interval in which the head turn tool 60 and mouth trim tool 65 are at work. The end of the thrust or feed rod 47 stands slightly back of the head of the lowermost workpiece supported on feed lever head 31 and the free end of a ejector rod 51 is within the body of the workpiece but out of contact therewith. The machining operations being completed, and the tools retired, the next operation is to eject the finished workpieces. For this purpose, the carriage is moved to the right (FIG. 1) by the activation of hydraulic cylinder 49 by one of the cams 58. Considerable power is necessary for this operation, since the workpiece was thrust into the die-chuck with a force sufficient to effect some deformation thereof. This movement of the carriage compresses the spring 50 which, it will be remembered, is in compression between carriage cross-head 45 and the fixed end of cylinder 49. The workpiece being freed from the die by such forceful movement of ejector rod 51, the bore 52 of such ejector rod is opened to a source of compressed air by the action of a cam 58, and ejection of the finished workpiece is completed by the air jet, the workpiece dropping into a suitable receptacle. The position of crosshead 45 at the end of the workpiece ejecting movement is shown in dotted lines in FIG. 1.

Continued rotation of cam shaft 36 both closes the air jet and cuts off the flow of hydraulic fluid which is moving piston 48 to the right; thereupon, the carriage is returned by spring 50 to the full line FIG. 1 position. At this time, cam 35 actuates workpiece feed lever 32 to align a workpiece with the die, as shown in dotted lines in FIG. 2. Thereupon, cylinder 49 is again energized, this time to thrust the piston rod 48 to the left, driving the aligned workpiece into the die. The position of crosshead 45 at the end of this movement is shown in broken lines in FIG. 1. The next movement of the carriage is its return to the full line FIG. 1 position, and this is most conveniently accomplished through the use of cylinder 55 which at this time is activated to restore the carriage to normal position, ready to repeat the described cycle.

What is claimed is:

1. Apparatus for operating on hollow cylindrical workpiece comprising a tubular forming die of solid one-piece cross section, means for feeding workpieces into alignment with said die, means for thrusting workpieces into said solid die whereby said workpieces are shaped to the configuration of said die, means for revolving said die about an axis concentric with the workpiece therein, a tool, means for applying said tool to said workpiece while rotating said die to perform an operation thereon and for retracting said tool upon completion of said operation, means for ejecting said workpiece from said die comprising a tubular member and connections thereto for applying a jet of compressed air to the interior of said hollow workpiece, a carriage mounting said workpiece thrusting and ejecting means, and hydraulic means for reciprocating said carriage in the direction of the axis of said die.

* * * * *